April 5, 1938.  J. BATE  2,113,074
MANUFACTURE OF BEARINGS
Filed Nov. 18, 1936
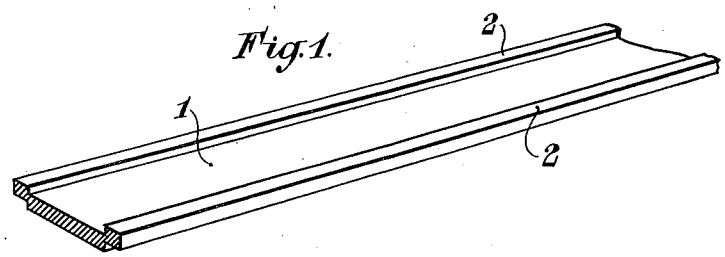
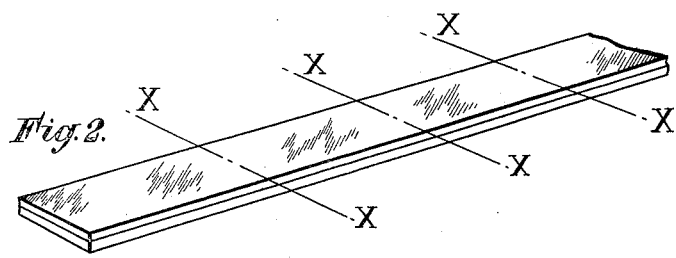
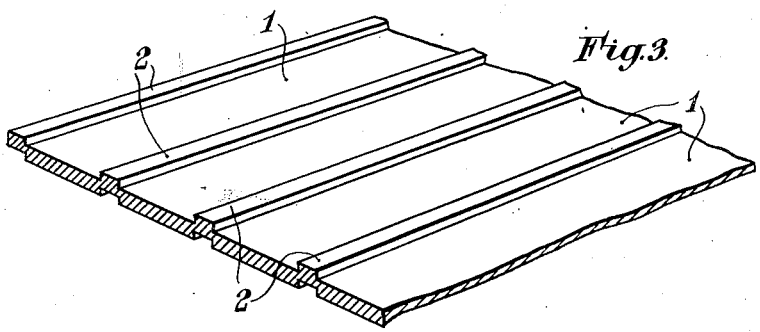
Inventor:
John Bate,
By Potter, Pierce + Scheffler,
Attorneys.

UNITED STATES PATENT OFFICE 2,113,074

MANUFACTURE OF BEARINGS

John Bate, Alperton, England, assignor to The Glacier Metal Company Limited, Alperton, England, a British company Application November 18, 1936, Serial No. 111,482
In Great Britain November 25, 1935

4 Claims. (Cl. 29—149.5)

This invention relates to the manufacture of bearings, and more particularly to one stage of a process wherein bearings are formed from blanks by any suitable means into circular or semi-circular form.

The invention is directed mainly, although not exclusively, towards the manufacture of blanks for bearings used in internal combustions motors, such, for example, as the gasoline and Diesel motors used in automobiles, aircraft and marine craft.

The only stage with which this invention is concerned is that of the production of a bi-metallic blank; the subsequent shaping of the blank, after it has been produced, does not form any part of the present invention.

By the term "bi-metallic blank" is meant a piece of material composed partly of backing metal as is commonly used for bearings, e. g. steel, brass, bronze, and alloys of these metals with each other or with metals not herein specified, and partly of bearing metal, e. g. white metal, babbitt metal and other non-ferrous alloys suitable for a working surface. The term "blank" or "bearing blank" shall herein be construed to mean a piece of material which has been formed to a predetermined size and coated with bearing metal, prior to its subsequent shaping into circular or semi-circular form.

Likewise, the term "shearing" and "part-shearing" shall be herein construed to refer to any process or operation resulting in a partial or complete fracture or cleavage of the metal, irrespective of whether or not a true shearing action is performed.

In the manufacture of bi-metallic articles it has already been proposed to place one of the metal bodies,—e. g. the backing member,—in a mold, in such a manner as to expose the surface to which the other metal—e. g. the bearing metal—is to be applied, and subsequently to fill the said mold with molten bearing metal up to any desired level, afterwards allowing both to unite with or without a flux, and/or the application of pressure.

The object of the present invention is to provide an improved process of manufacture of bi-metallic bearing blanks in which the mold is dispensed with, thereby rendering the process both cheaper and more readily performed without complicated machinery.

Another object of the invention is to provide a method of making bearing blanks adapted for their production in large quantities.

Other objects will be apparent from the description which follows and which shows one way of carrying the invention into effect for the purpose of example only.

The invention will be more readily understood from the following description, read in conjunction with the accompanying drawing, whereof:—

Fig. 1 illustrates a length of material whereon the part shearing has been performed, Fig. 2 illustrates a length of material with the part shear completed, and the side strips removed, ready for cutting up into blanks.

Fig. 3 illustrates a length of material with a series of continuous indentations formed by part shearing.

Referring to Figs. 1 and 2 of the drawing, a length of steel of given width is passed through a punching machine, which forms a continuous depression in the material in such a manner that the opposite edges of the depression are partially sheared through, without, however, completely severing the depressed portion from the rest of the strip. The resultant product is a strip having a flat channel 1 therein and two raised borders 2 on each side.

The material is then tinned, or otherwise coated with flux, to assist in the subsequent white metalling process, and then is heated and molten white metal run into the depression 1. The material is then passed under a scraper which removes the surplus white metal from the raised surface 2, leaving it flush with the original surface of the material. The length of material is then cooled, and subjected to a further punching or cutting operation, adapted to sever the depressed portion 1 from the rest of the material by completing the partially effected shear, thereby forming a length of flat metal ready coated and adapted to be cut into flat blanks along the lines X—X.

In the embodiment shown in Fig. 3, an exactly similar method is performed, except that, instead of one continuous depression being formed, a number are formed side by side. The method of flooding with white metal and of severing the depressed portion from the raised portion is identical with that described with reference to Figs. 1 and 2.

Having thus described my invention, what I claim and desire to protect by Letters Patent is:—

1. The process of making bi-metal bearing blanks by uniting bearing metal with a backing metal which comprises forming an elongated shallow channel in a flat metal backing plate by punching an elongated strip section of the plate to shear the same incompletely from the plate metal at opposite edges of the punched strip section, flowing molten bearing metal into the channel to coat the punched strip section, completing the shearing of the coated strip section from the plate after the bearing metal solidifies and dividing the coated strip section into blanks.

2. In the process of forming bearing blanks by flowing molten bearing metal into a channel-shaped strip of backing metal, the steps which comprise punching a flat plate of backing metal to effect an incomplete shear of an elongated strip portion from the adjacent portions of the plate, thereby to form a flat channel-shaped strip, and completing the shearing after the bearing metal is flowed into the channel and solidified.

3. In the manufacture of a composite metal strip, the steps which comprise punching an elongated strip section of a flat metal plate to initiate a shear of the same from the adjacent plate portions extending along opposite sides of the strip section, flowing molten metal into the channel formed by the strip section and adjacent plate portions, and shearing the strip section from the adjacent plate portions after cooling of the molten metal.

4. In the manufacture of composite metal strips, the process which comprises punching spaced strip sections of a flat metal plate to shear the punched sections incompletely from the plate metal extending along opposite sides of the punched sections, thereby to form a plurality of shallow channels separated by ribs, positioning the plate horizontally with the ribs upward, flowing molten metal into the channels to the level of the separating ribs, and completing the shearing of the punched sections from the rib sections after cooling of the molten metal.

JOHN BATE.